April 8, 1958 E. J. POSSELT 2,830,248
DYNAMIC BRAKING CONTROL FOR SERIES WOUND MOTORS
Filed Feb. 6, 1957 4 Sheets-Sheet 3

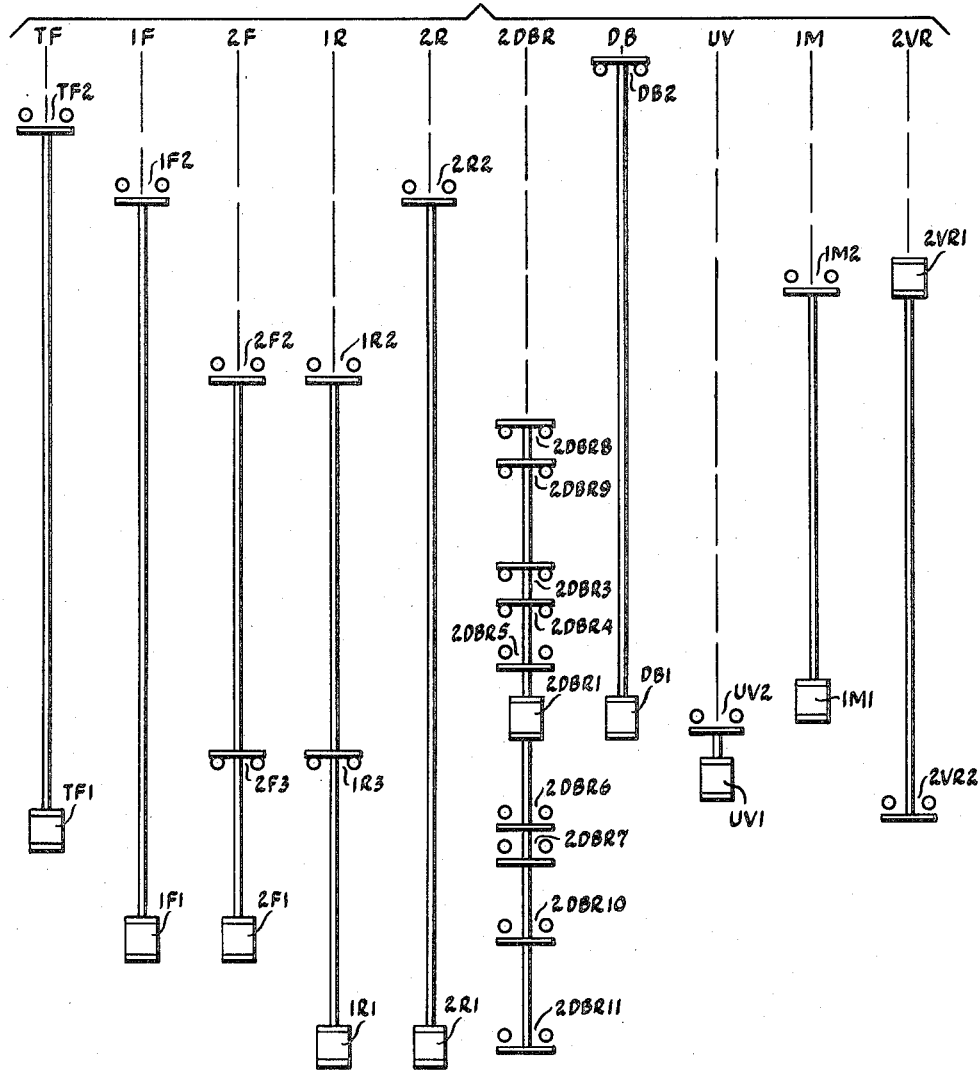

United States Patent Office 2,830,248
Patented Apr. 8, 1958

2,830,248

DYNAMIC BRAKING CONTROL FOR SERIES WOUND MOTORS

Edward J. Posselt, Shorewood, Wis., assignor to Cutler-Hammer, Inc., Milwaukee, Wis., a corporation of Delaware Application February 6, 1957, Serial No. 638,424

5 Claims. (Cl. 318—261)

This invention relates to improved dynamic braking control for series wound motors.

In the Newman and Posselt application Serial No. 602,233, filed August 6, 1956, certain novel forms of dynamic braking control systems for series wound motors are disclosed and claimed, and the present invention constitutes improvements thereon.

It is the object of the present invention to provide the same type of dynamic braking control, but with reduction in the number of contactors and relays utilized, and thus in the consequent cost of producing the same.

Other objects and advantages of the invention will hereinafter appear.

The accompanying drawings illustrate certain preferred embodiment of the invention which will now be described, it being understood that the embodiments illustrated are susceptible of modifications without departing from the scope of the appended claims.

Referring to the drawing:

Fig. 4 is a schedule of relays and contactors for the modified form shown in Fig. 3.

Figure 1:
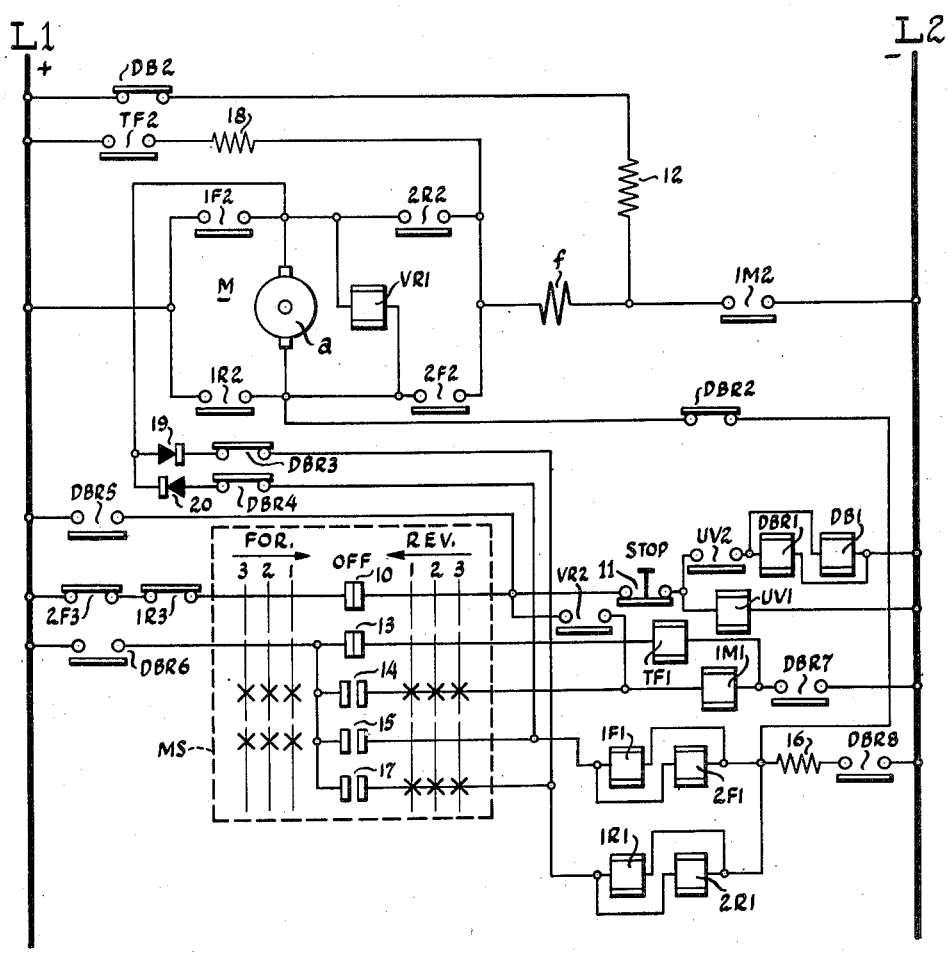
Figure 1 is a diagrammatic showing of a control system for a series wound D. C. motor embodying the invention.

Referring to Fig. 1, it shows a series wound D. C. motor M having an armature $a$ and a series field winding $f$. A master control depicted within the broken line rectangle MS is of a conventional type and is operable from an "off" to first, second and third operating positions, "forward" and "reverse," respectively, to establish "forward" and "reverse" energizing connections for armature $a$ and field winding $f$ from D. C. power supply lines L1, L2.

Contacts 10 of controller MS are closed in the "off" position of the latter and open in the "forward" and "reverse" operating positions. When closed, contacts 10 complete a circuit from line L1 through normally closed contacts 2F3 and 1R3 of "forward" and "reverse" directional contactors 2F and 1R, contacts 10, dynamic "stop" pushbutton switch 11 through operating coil UV1 of an under-voltage relay UV to line L2, and through normally open contacts UV2 of relay UV and the parallel connected operating coils DB1 and DBR1 of dynamic braking relays DB and DBR, to line L2. With line L1 and L2 energized it will be seen that an energizing circuit will be completed for coil UV1 is to afford closure of contacts UV2 and thereby effect energization of coils DB1 and DBR1. Energization of DB1 effects opening of normally closed contact DB2 to interrupt the connection of the right-hand end of field winding $f$ through a resistor 12 to line L1. Normally closed contacts DBR2, DBR3 and DBR4 of relay DBR are opened to interrupt dynamic braking connections for the motor which will be hereinafter more fully described. Normally open contacts DBR5 are closed to provide a maintaining circuit around contact 10 and contacts 2F3 and 1R3, thereby insuring that coils UV1, DB1 and DBR1 of relays UV, DB and DBR will normally be maintained energized whenever controller MS is moved to any of the "forward" or "reverse" operating positions.

Closure of normally open contacts DBR6 completes connection from line L1 to contacts 13, 14, 15 and 17 of controller MS. Closure of normally open contacts DBR7 completes a connection from line L2 through operating coils TF1 and 1M1 to contacts 13 and 14, respectively of controller MS. Closure of normally open contacts DBR8 completes connection for the parallel connected operating coils 1F1 and 2F1 of "forward" direction contacts 1F and 2F from contacts 15 of controller MS through coils 1F1 and 2F1, a resistor 16 and the then closed contacts DBR8 to line L2. Similarly, closed contacts DBR8 completes connection for the parallel operated coil 1R1 and 2R1 of "reverse" directional contacts 1R and 2R from contact 17 of controller MS through coils 1R1 and 2R1, resistor 16 and contacts DBR8 to line L2.

When controller MS is operated from "off" to the "forward" operating positions a circuit will initially be completed from line L1 through contacts DBR6, the closed contacts 14 of controller MS, coils 1M1 and the closed contact DBR7 to line L2 to energize coil 1M1 to close its contacts 1M2 and thereby connect the right-hand end of field winding $f$ to line L2. Contacts 15 of controller MS close in the "forward" operating positions to initially complete a circuit from line L1 through the then closed contacts DBR6, contacts 15, coils 1F1 and 2F1, resistor 16 and closed contact DBR8 to line L2. Thus coils 1F1 and 2F1 will be energized to close contacts 1F2 and 2F2 and open contacts 2F3. Closure of contacts 1F2 and 2F2 results in completion of "forward" direction power connections for motor M from line L1 through contacts 1F2, armature $a$, contacts 2F2, field winding $f$ and contacts 1M2, to line L2. Contacts 13 of controller MS open in both the "forward" and "reverse" operating positions to interrupt the energizing connections for coils TF1 to open contacts TF2 to interrupt the connection of left-hand end of field winding $f$ through a resistor 18 to line L1.

When the "forward" power connections are thus established motor M will accelerate and run in the "forward" direction. In practice, one or more accelerating resistors (not shown) would be connected in series between field winding $f$ and contacts 1M2 and would be successively shunted out of circuit on the second and higher operating positions of the controller (both in "forward" and "reverse" operating positions) through the medium of additional contacts carried by controller MS (not shown) and shunting contactors (not shown) under the control of the latter contacts. As such are well known, and does not form part of the invention, they are omitted for the sake of simplicity.

If when motor M is running in the "forward" direction the supply of power should fail, the supply voltage decrease below the drop-out voltage of coil UV1 of relay UV or switch 11 be deliberately opened, relay UV will drop out to open its contacts UV2. Consequently, coils DB1 and DBR1 of DB and DBR will be deenergized and as a result contacts DBR6, DBR7 and DBR8 open, thereby interrupting the energizing connections for coils 1M1, 1F1 and 2F1 of the main and "forward" directional contactors 1M, 1F and 2F, respectively. Accordingyy, "forward" power connections to armature $a$ are interrupted and connection of right-hand end field winding $f$ to line L2 is also interrupted. Concurrent with interruption of the "forward" directional power connections, contacts DB2, DBR2, DBR3 and DBR4 close to establish dynamic braking connections for motor M which will now be described in detail.

With the armature $a$ rotating in a "forward" direction, due to counter E. M. F. of the motor, current will flow from the upper terminal of armature $a$ through a half-wave rectifier 19, the closed contact DBR3, operating coils 1R1 and 2R1 of "reverse" directional contactor 1R and 2R, closed contacts DBR2 to the lower terminal of armature $a$. Initially current flow through coils 1R1 and 2R1 is sufficient to effect closure of directional contacts 1R2 and 2R2. Accordingly, braking current flows from the upper terminal of armature $a$ through the then closed contacts 2R2, field winding $f$, braking resistor 12, closed contacts DB2, closed contacts 1R2 to the lower terminal of armature $a$. With the dynamic braking circuit thus established, armature $a$ will be rapidly brought to rest. As the armature speed approaches zero the counter E. M. F. will decrease to a value causing contactors 1R and 2R to drop out to open their associated contacts 1R2 and 2R2 and thus interrupt the dynamic braking circuit. If controller MS is returned to the "off" position depicted in the drawing and normal voltage supply is restored, coils UV1, DB1 and DBR1 will again become energized if switch 11 is closed.

When controller MS is operated from "off" to any one of its "reverse" operating positions contacts 10, 13 and 14 will be operated as aforedescribed in connection with the "forward" operation. Contacts 15 will remain open and contacts 17 will close. Closure of contacts 17 completes energizing connections for coils 1R1 and 2R1 of "reverse" directional contactors 1R and 2R. Energization of coils 1R1 and 2R1 result in closure of contacts 1R2 and 2R2 to complete "reverse" directional power connections for motor M from L1 through contact 1R2, armature $a$, contact 2R2, field winding $f$ and the then closed contacts 1M2 to line 1L2. Motor M will accordingly accelerate and run in the "reverse" direction. If when motor M is running in "reverse" direction dynamic braking action is initiated in one of the ways aforedescribed, relay UV will drop out to effect deenergization of coils DB1 and DBR1. As aforeindicated, deenergization of coils DB1 and DBR1 results in establishment of dynamic braking connections for the motor. With armature $a$ rotating in the "reverse" direction counter E. M. F. current will flow from the lower terminal of armature $a$ through contacts DBR2, operating coils 1F1 and 2F1 of "forward" contactors 1F and 2F, contacts DBR4 and half-wave rectifier 20 to the upper terminal of armature $a$. Current flow through coils 1F1 and 2F1 is sufficient to effect closure of "forward" directional contacts 1F2 and 2F2. Accordingly, braking current will flow from the lower terminal of armature $a$ through closed contacts 2F2, field winding $f$, braking resistor 12, contacts DB2, closed contacts 1F2 to the upper terminal of armature $a$. Consequently, armature $a$ will rapidly be brought to rest. As the armature speed approaches zero the counter E. M. F. will decrease to a value causing contacts 1F1 to 2F1 to drop out and open their contacts 1F2 and 2F2 and the system will finally return to the condition depicted in Fig. 1.

The arrangement of rectifiers 19, 20, contacts DBR2, DBR3 and DBR4 and coils 1F1, 2F1, 1R1 and 2R1 hereinbefore described is such that the dynamic braking circuit established from the motor will depend entirely on the direction of armature rotation obtained at the time dynamic braking operation is initiated and will automatically be the correct one for that direction of rotation. Rectifiers 19, 20 afford proper polarity discrimination for the energization of coils 1F1, 2F1 or coils 1R1 and 2R1 in accordance with the direction of armature rotation and counter E. M. F. The use of contacts 2F3 and 1R3 in the circuit connection from line L1 to controller contacts 10 insures that dynamic braking must be completed before coils DB1 and DBR1 can again be energized by return of controller MS to "off" position.

As aforeindicated, during power operation either at "forward" or "reverse" direction contacts 13 of controller MS are open to interrupt the energizing circuit for coil TF1, thereby opening contact TF2. If the operator moves controller MS to "off" to "drift" the counter E. M. F. of armature $a$ will cause current flow through a coil VR1 of a voltage relay VR which is connected across armature $a$ to maintain such relay energized to keep its contacts VR2 closed. Such closure of contacts VR2 insures maintenance of an energizing connection for coil 1M1 of main contactor 1M, to maintain connection of field winding $f$ to line L2 through closed contacts 1M2. As contacts 13 will reclose upon movement of controller MS to the "off" position coil TF1 will be energized to close its contact TF2 to complete energizing connection for field winding $f$ from line L1 through the then closed contact TF2, resistor 18, field winding $f$ and the then closed contacts 1M2 to line L2. Thus field winding $f$ will be energized independently of armature $a$ to maintain counter E. M. F. in armature $a$ during "drifting" and thus insure dynamic braking action, if the dynamic braking circuit should be initiated during "drift." As the speed of armature $a$ approaches zero during "drifting" the energization of coil VR1 decreases and finally drops to associated contacts VR2 to deenergize coil 1M1 and thereby upon contacts 1M2 to disconnect field winding $f$ from line L2.

Figure 2:
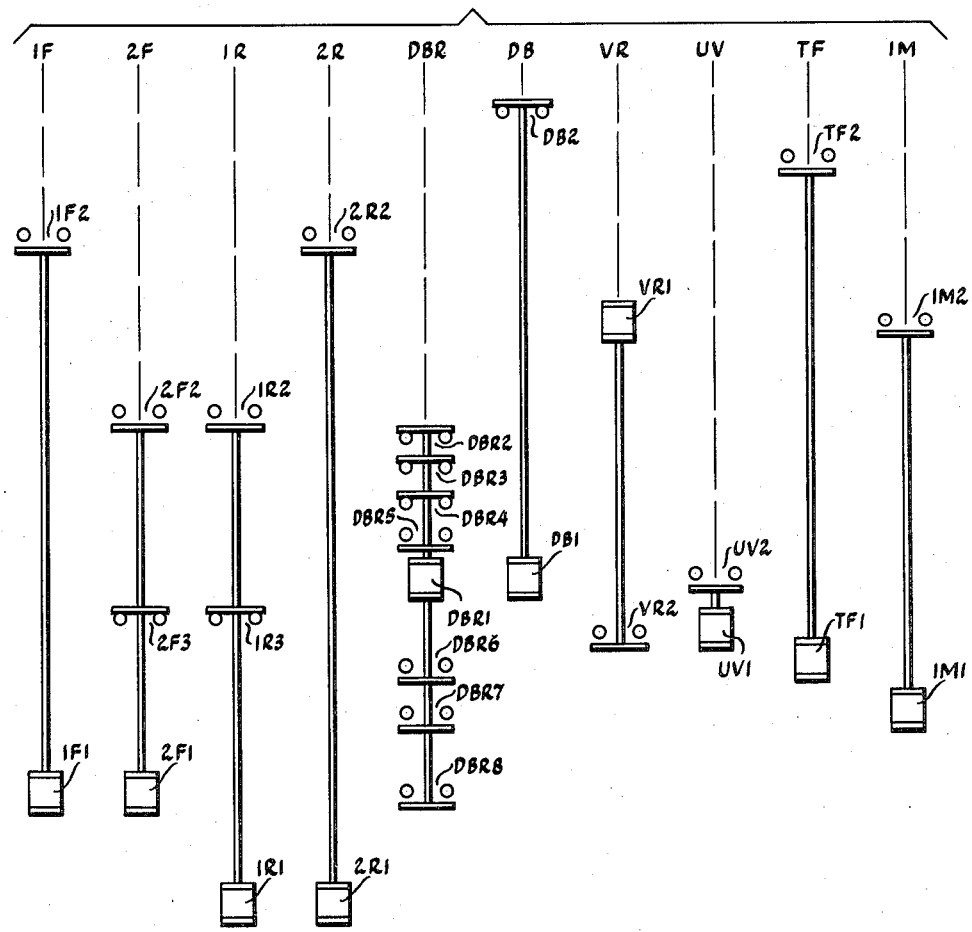
Fig. 2 is a schedule of relays and contactors shown in Fig. 1 with their contacts and operating coils lined.
Figure 3:
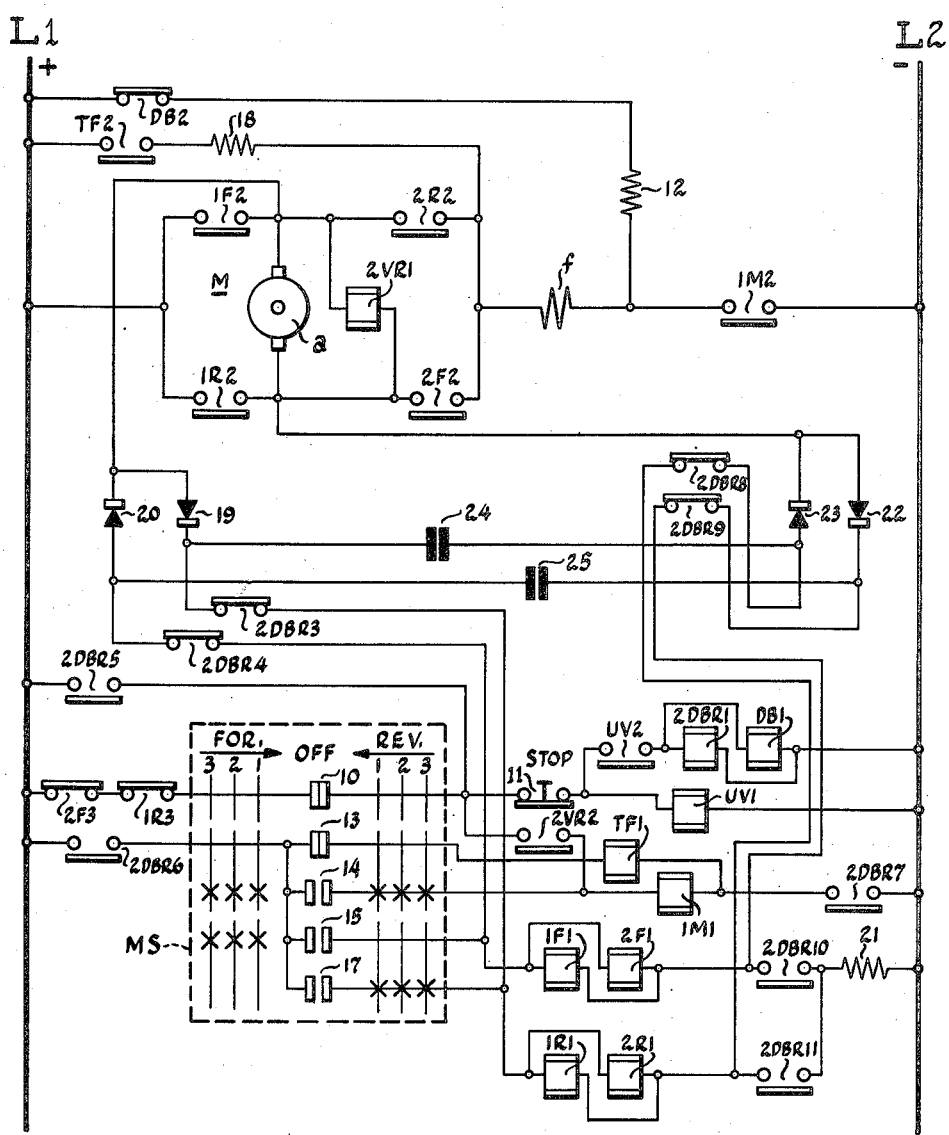
Fig. 3 is a modified form of the control system shown in Fig. 1.

The modified form of control system depicted in Figs. 3 and 4 is similar to that of Figs. 1 and 2 and corresponding elements are designated with like reference numerals. In the modified form coils 1F1 and 2F1 are connectable to line L2 in series with a resistor 21 through closure of normally open contacts 2DBR10 and to the low terminal of armature $a$ of motor M through normally closed contacts 2DBR9 and a half-wave rectifier 22. Coils 1R1 and 2R1 are connectable to line L2 in series with resistor 21 through closure of normally open contacts 2DBR11 and are connected to the lower terminal of armature $a$ of motor M through normally closed contacts 2DBR8 and a half wave rectifier 23. A capacitor 24 is connected at one terminal to the point common between rectifier 19 and contacts 2DBR3 and at its other terminal to the point common between rectifier 23 and contacts 2DBR8. Correspondingly, a capacitor 25 is connected at one terminal to the point common between rectifier 20 and contacts 2DBR4 and is connected at its other terminal to the point common between rectifier 22 and contacts 2DBR9.

When controller MS is operated to establish "forward" running connections for motor M, current will flow from line L1 through contacts 1F2, rectifier 19, capacitor 24, rectifier 23, contacts 2F2, field winding $f$ and contacts 1M2 to line L2 to charge capacitor 24. When establishment of dynamic braking connections is initiated capacitor 24 will discharge through coils 1R1 and 2R1 and contacts 2DBR8 to give a boost to the current afforded by counter E. M. F. of armature $a$ thereby insuring immediate pick-up of contactors 1R and 2R to promptly establish the proper dynamic braking connections for armature $a$ and field winding $f$.

When controller MS is operated to establish "reverse" running connections for motor M, current will flow from line L1 through contacts 1R2, rectifier 22, capacitor 25, rectifier 20, contacts 2R2, field winding $f$ and contacts 1M2 to line L2 to charge capacitor 25. When establishment of dynamic braking connections is initiated with the motor running in the "reverse" direction, capacitor 25 will discharge through closed contacts 2DBR9, coils 2F1 and 1F1 to give a boost to counter E. M. F. current thereby insuring immediate pick-up of contacts 1F and 2F to promptly establish the proper dynamic braking connections for armature $a$ and field winding $f$.

I claim:
1. The combination with a series wound motor, electroresponsive switches for establishing forward and reverse power connections for said motor and means for selectively energizing and deenergizing said switches, of dynamic braking control comprising a resistor, unidirectional conducting means, and electroresponsive means normally energized by and responsive to decrease in power supply voltage below a predetermined value to interrupt power connections to said motor and connect the energizing coils of said switches in circuit with said unidirectional conducting means across the armature of said motor, said unidirectional means affording energization of said switches in accordance with the direction of armature rotation to afford connections of said resistor in a dynamic braking loop circuit with the armature and field winding of said motor with said field winding connected appropriately for the direction of armature rotation.

2. The combination according to claim 1 wherein said unidirectional conducting means comprises half-wave rectifiers so poled that when connected in circuit with said coils of said switches across the armature of the motor the coils energized by the first mentioned means to afford reverse direction power operation are energized when the armature is rotating in the forward direction and the coils normally energized by said first mentioned means to afford forward direction power operation are energized when the armature is rotating in the reverse direction.

3. The combination according to claim 2 wherein said electroresponsive switches comprise at least two normally energizable means to establish forward direction power connections and at least two normally energizable means to establish reverse direction power connections, and wherein upon the aforementioned response of said electroresponsive means one rectifier is connected in series with the coils of the first mentioned two switches across said armature and another rectifier is connected in series with the operating coils of the other two switches across said armature.

4. The combination according to claim 1 wherein said dynamic braking control further comprises at least two capacitors, each of which is connected in circuit with and individualized to certain of said unidirectional means and coils of certain of said switches across the armature of said motor, said capacitors being charged with power supply voltage in accordance with the direction of motor power running and discharging through the coils of the switches to which they are individualized when said electroresponsive means responds as aforementioned to thereby insure prompt energization of their associated switch operating coils.

5. The combination according to claim 4 wherein each capacitor is connected in series with and interposed between a pair of unidirectional conducting means across said armature and is connected across the coils with which it is individualized upon the aforementioned response of said electroresponsive means.

References Cited in the file of this patent
UNITED STATES PATENTS
2,646,541     Lesniak _____ July 21, 1953